(12) United States Patent
Chu (10) Patent No.: US 7,001,173 B1
(45) Date of Patent: Feb. 21, 2006

(54) MOLD GUIDING DEVICE

(76) Inventor: En Te Chu, NO. 1,Alley 16, Lane 40, Jinde Rd, East District, Taichung City401 (TW)

( * ) Notice: Subject to any disclaimer, the term of this patent is extended or adjusted under 35 U.S.C. 154(b) by 0 days.

(21) Appl. No.: 10/950,238

(22) Filed: Sep. 24, 2004

(51) Int. Cl.
*B29C 45/66* (2006.01)

(52) U.S. Cl. .......................... 425/589; 384/30; 384/48; 384/49; 425/182; 425/193; 425/472

(58) Field of Classification Search ............... 425/113, 425/182, 193, 589, 472; 384/30, 48, 49, 384/24
See application file for complete search history.

(56) References Cited

U.S. PATENT DOCUMENTS

| | | | | |
|---|---|---|---|---|
| 3,213,717 | A * | 10/1965 | Breuning ..................... | 408/154 |
| 3,514,166 | A * | 5/1970 | Coley ........................... | 384/49 |
| 3,578,826 | A * | 5/1971 | Janiszewski ................. | 384/30 |
| 3,740,178 | A * | 6/1973 | Neil ............................ | 425/182 |
| 3,849,048 | A * | 11/1974 | Bielfeldt et al. ............ | 425/567 |
| 4,648,727 | A * | 3/1987 | O'Neil et al. ................ | 384/49 |
| 5,156,462 | A * | 10/1992 | Jacob et al. .................. | 384/49 |
| 5,397,111 | A * | 3/1995 | Knopp et al. ............ | 267/64.12 |
| 5,674,318 | A * | 10/1997 | Milliman .................... | 118/405 |
| 5,679,157 | A * | 10/1997 | Milliman .................... | 118/405 |
| 6,805,827 | B1 * | 10/2004 | Kami et al. ............... | 264/328.1 |
| 6,821,463 | B1 * | 11/2004 | Di Dio et al. ............. | 264/40.5 |
| 6,832,906 | B1 * | 12/2004 | Hamann ..................... | 425/170 |
| 6,851,858 | B1 * | 2/2005 | Chu ............................ | 384/49 |
| 2001/0024001 | A1 * | 9/2001 | Steger et al. ............... | 264/513 |
| 2001/0036493 | A1 * | 11/2001 | Glaesener et al. .......... | 425/589 |
| 2001/0038868 | A1 * | 11/2001 | Eppich et al. ............. | 425/542 |
| 2002/0071889 | A1 * | 6/2002 | Koide et al. ................ | 425/589 |
| 2002/0164395 | A1 * | 11/2002 | Yoshinaga et al. .......... | 425/589 |
| 2002/0176908 | A1 * | 11/2002 | Yoshinaga et al. .......... | 425/589 |
| 2003/0020194 | A1 * | 1/2003 | Di Dio et al. ............. | 264/40.5 |
| 2003/0082260 | A1 * | 5/2003 | Kishi et al. .............. | 425/451.7 |
| 2003/0082269 | A1 * | 5/2003 | Morwald .................... | 425/589 |
| 2003/0137082 | A1 * | 7/2003 | Wohlrab .................. | 264/328.1 |
| 2003/0141632 | A1 * | 7/2003 | Fuller et al. ............. | 264/328.1 |
| 2003/0190386 | A1 * | 10/2003 | Fujita et al. ................ | 425/589 |
| 2003/0203068 | A1 * | 10/2003 | Wohlrab ..................... | 425/589 |
| 2003/0228391 | A1 * | 12/2003 | Meschia et al. ............ | 425/589 |
| 2004/0013766 | A1 * | 1/2004 | Yoshioka .................... | 425/589 |
| 2004/0091570 | A1 * | 5/2004 | Wohlrab et al. ............ | 425/589 |

* cited by examiner

*Primary Examiner*—Robert Davis
*Assistant Examiner*—G. Nagesh Rao
(74) *Attorney, Agent, or Firm*—Pro-Techtor Int'l Services (57) ABSTRACT

A mold guiding device includes a tube having a hole in an end thereof and a threaded recess is defined in an inner end of the hole. A positioning member and a first end of a sleeve are inserted in the hole in sequence. A rod extends through the passage of the sleeve and the central hole of the positioning member and is threadedly engaged with the threaded recess in the tube. The diameter is the same as the sleeve when the sleeve is positioned in still, and is movable when the diameter of the positioning member is smaller than the passage of the sleeve.

1 Claim, 9 Drawing Sheets

MOLD GUIDING DEVICE

FIELD OF THE INVENTION

The present invention relates to a mold guiding device which can be set to be fixed position or adjustable position by optionally replacing a positioning member.

BACKGROUND OF THE INVENTION

Figure 1:
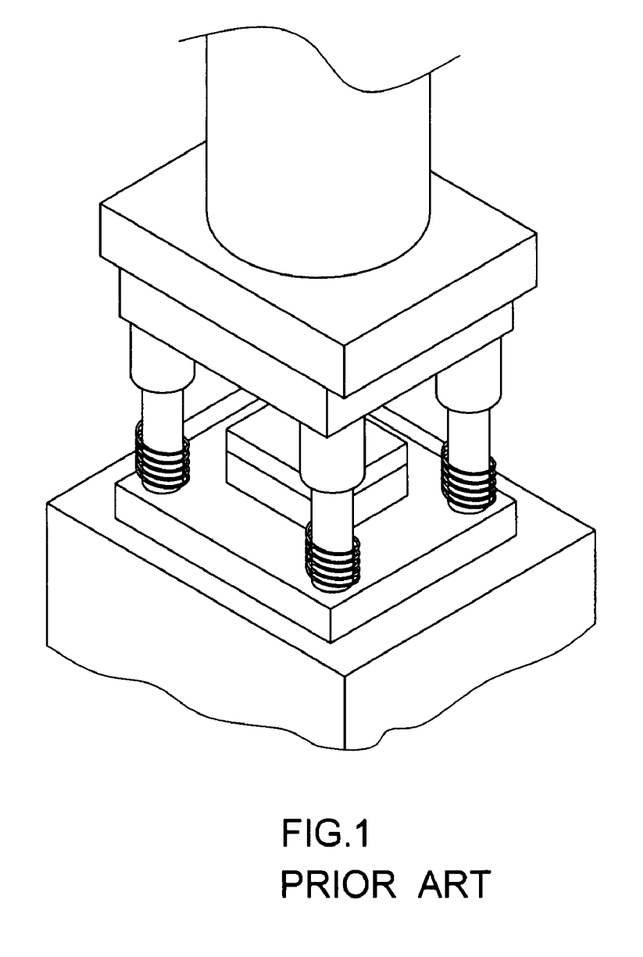
FIG. 1 is a perspective view to show the use of the mold guiding device.
Figure 2:
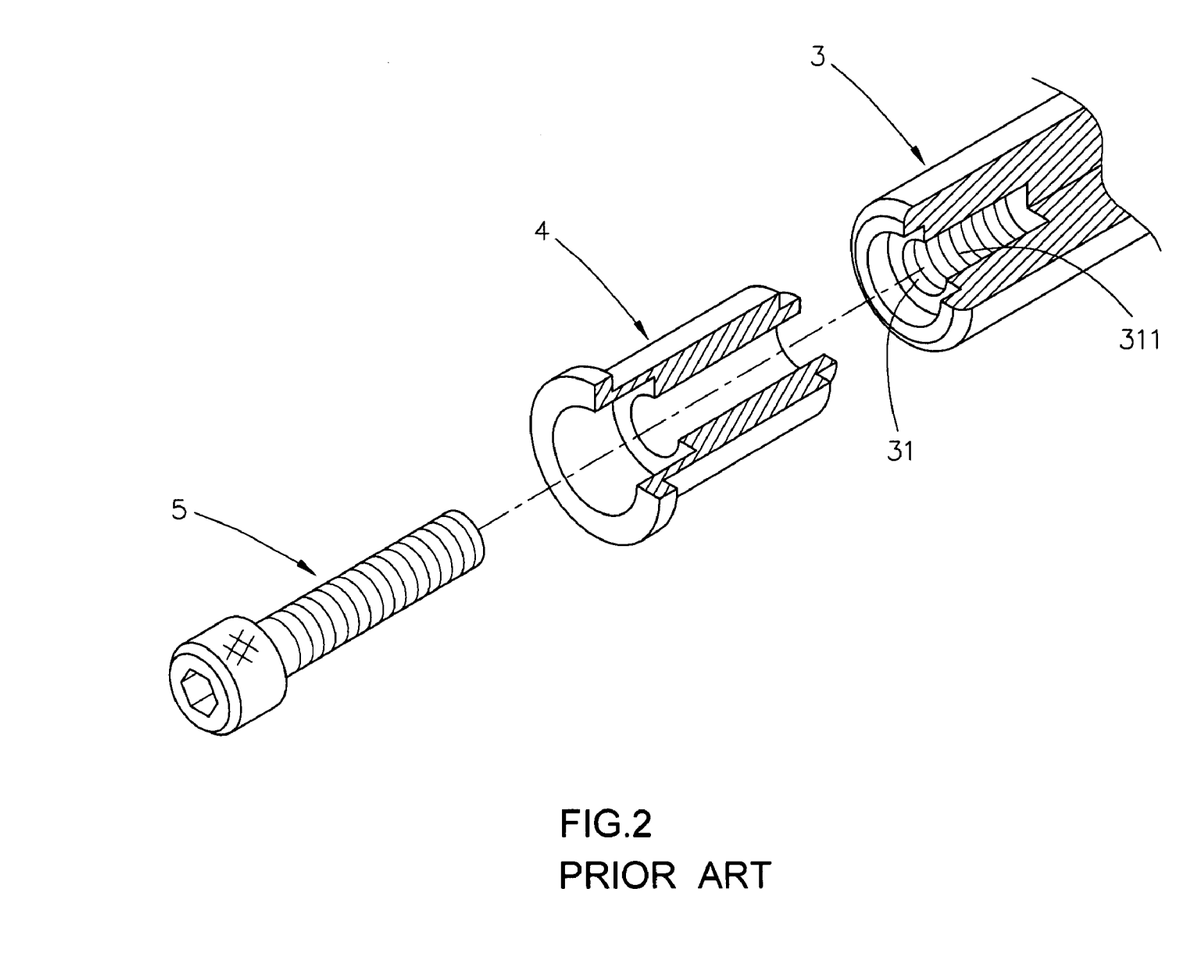
FIG. 2 is an exploded view to show the conventional mold guiding device wherein the sleeve is positioned stationary.
Figure 3:
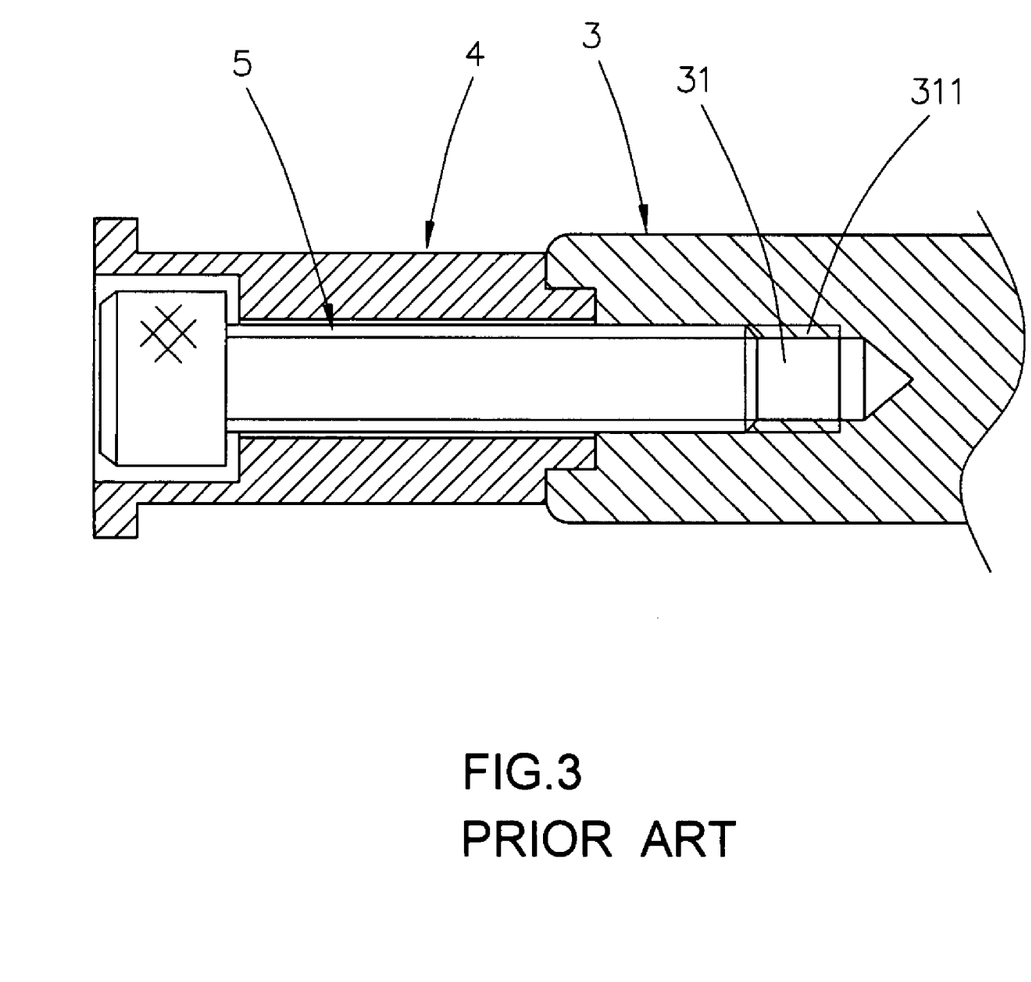
FIG. 3 is cross sectional view to show the conventional mold guiding device wherein the sleeve is positioned stationary.
Figure 4:
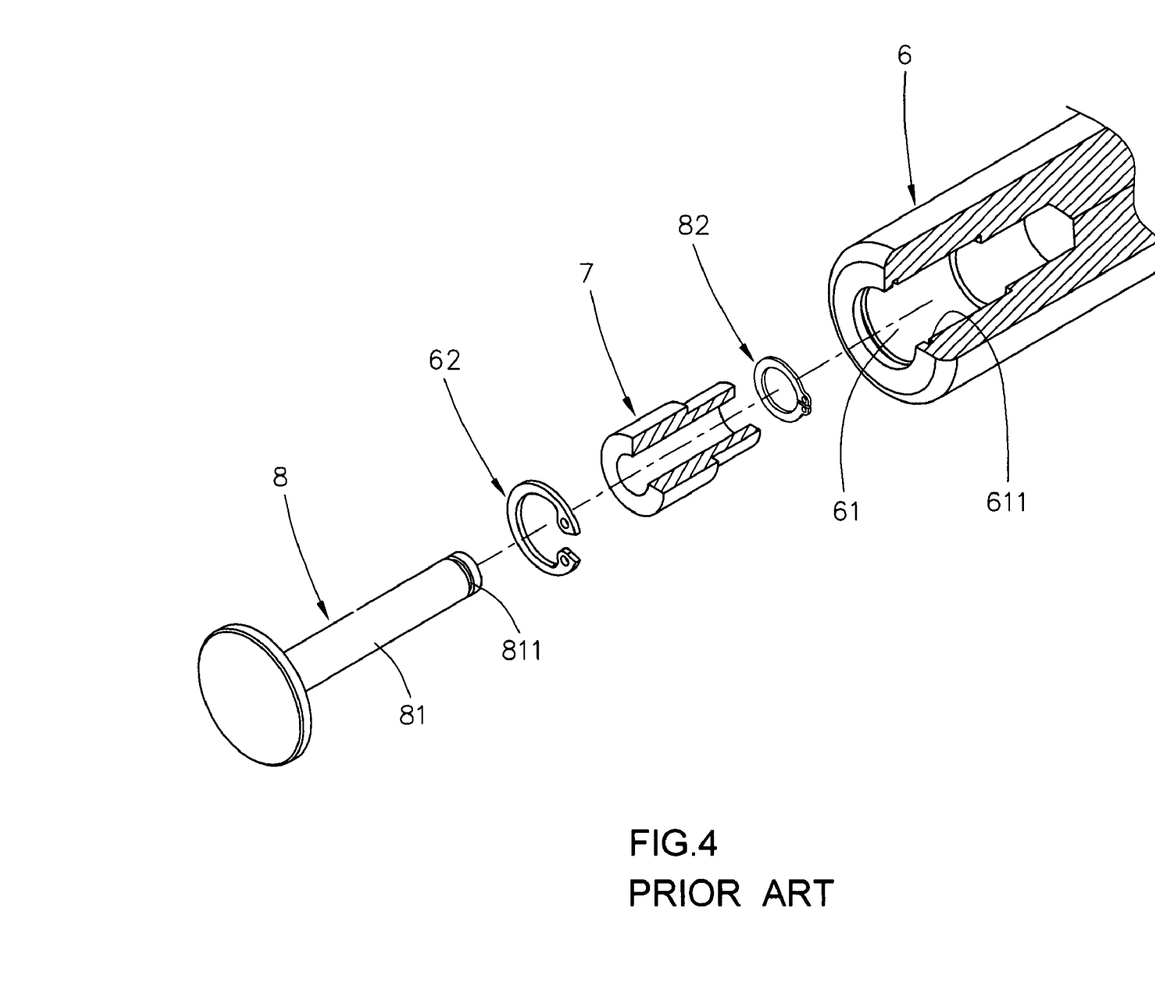
FIG. 4 is an exploded view to show the conventional mold guiding device wherein the sleeve is movable.
Figure 5:
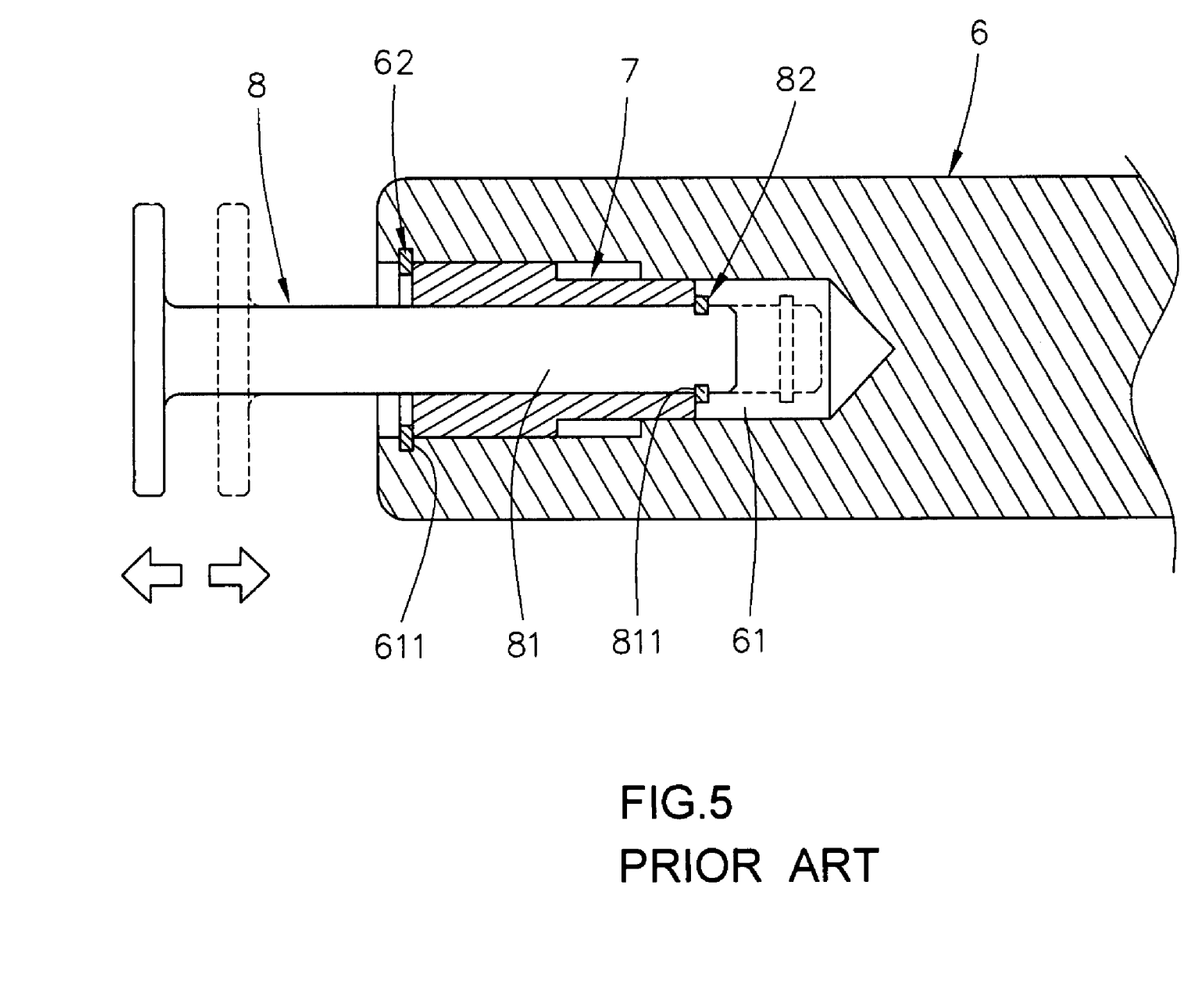
FIG. 5 is cross sectional view to show the conventional mold guiding device wherein the sleeve is movable.

In order to adjust the position of a mold set quickly and conveniently, a mold guiding device is developed and a conventional mold guiding device is disclosed in FIGS. 1, 2 and 3, and generally includes a guide tube 3 which has a hole 31 defined in an end thereof and a threaded recess 311 is defined in an inner end of the hole 31. A sleeve 4 has a stepped outer periphery and is inserted in the hole 31 of the guide tube 3. A threaded rod 5 extends through the sleeve 4 and is connected with the threaded recess 311 such that the threaded rod 5 is positioned. However, the threaded rod 5 cannot be adjusted. FIGS. 4 and 5 show another conventional mold guiding device which includes a guide tube 6 having a stepped hole 61 defined in an end thereof and a groove 611 is defined in an inner periphery of the stepped hole 61. A sleeve 7 having a stepped outer periphery is inserted in the stepped hole 61 and a C-clip 62 is engaged with the groove 611 so as to prevent the sleeve 7 from disengaging from the stepped hole 61. A rod 8 movably extends through the sleeve 7 and a clip 82 is engaged with a groove 811 defined in the distal end of the shank 81 of the rod 8 such that the rod 8 cannot be disengaged from the sleeve 7. A space is defined between the sleeve 7 and the inner end of the stepped hole 61 so that the rod 8 can be moved as shown in FIG. 5. However, these two conventional devices do not share common parts so that the users have to prepare two sets of the conventional mold guiding devices to meet different needs, and this requires a lot of money.

The present invention intends to provide a mold guiding device that includes two positioning members which are optionally replaced with each other in different situations.

SUMMARY OF THE INVENTION

The present invention relates to a mold guiding device that includes a tube having a hole in an end thereof and a threaded recess is defined in an inner end of the hole. A positioning member is inserted in the hole of the tube and has a central hole defined therethrough. A sleeve has a first end thereof inserted in the hole of the tube and a flange extends radially outward from a second end of the sleeve. A passage is defined through the sleeve and forms an opening in the first end of the sleeve. An annular lip extends inward from the opening at the first end of the sleeve. A rod extends through the passage of the sleeve and the central hole of the positioning member and is threadedly engaged with the threaded recess in the tube. The sleeve can be set to be movable or stationary by replacing the positioning member of different diameters.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 6:
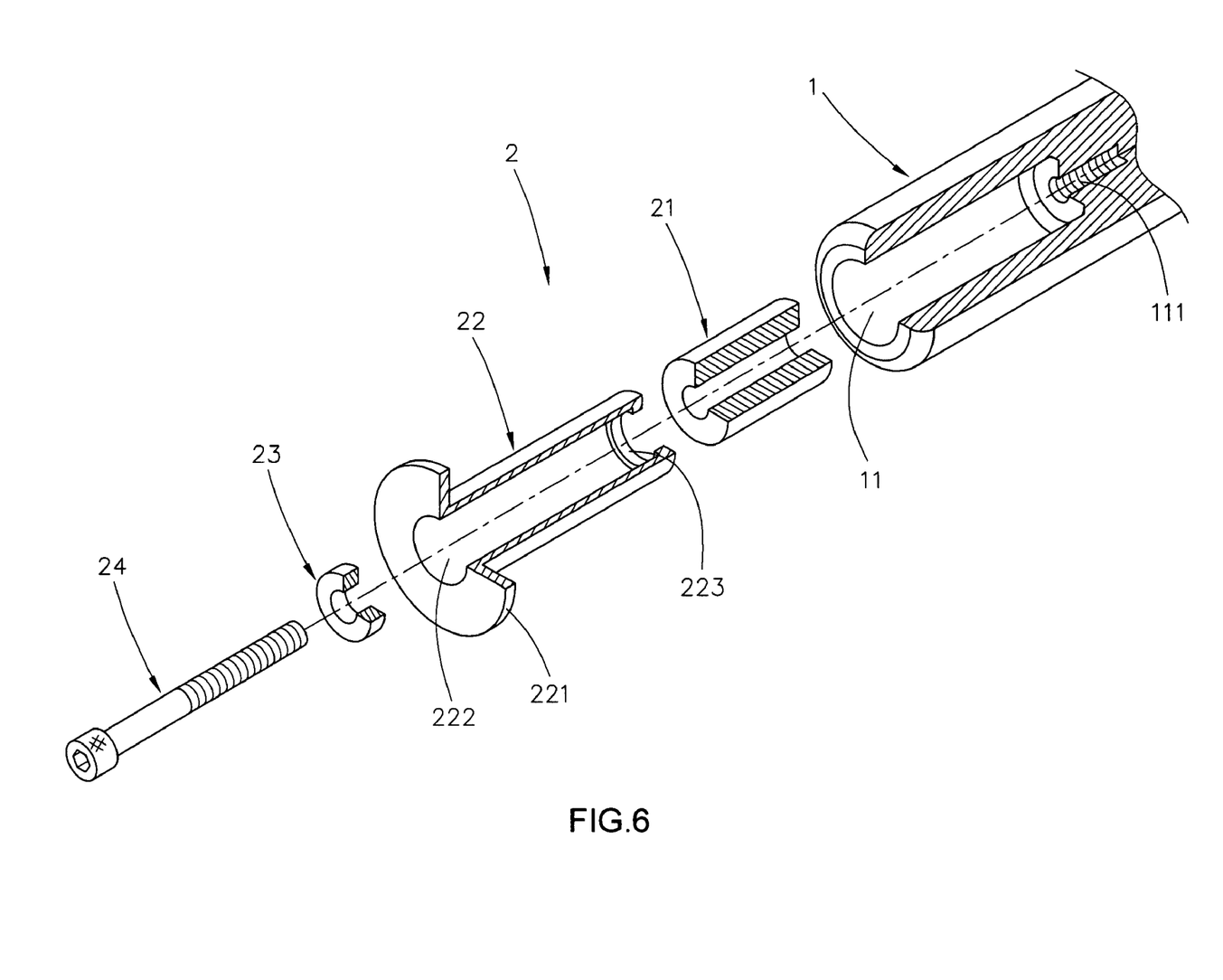
FIG. 6 is an exploded view to show the mold guiding device of the present invention wherein the sleeve is positioned stationary.
Figure 7:
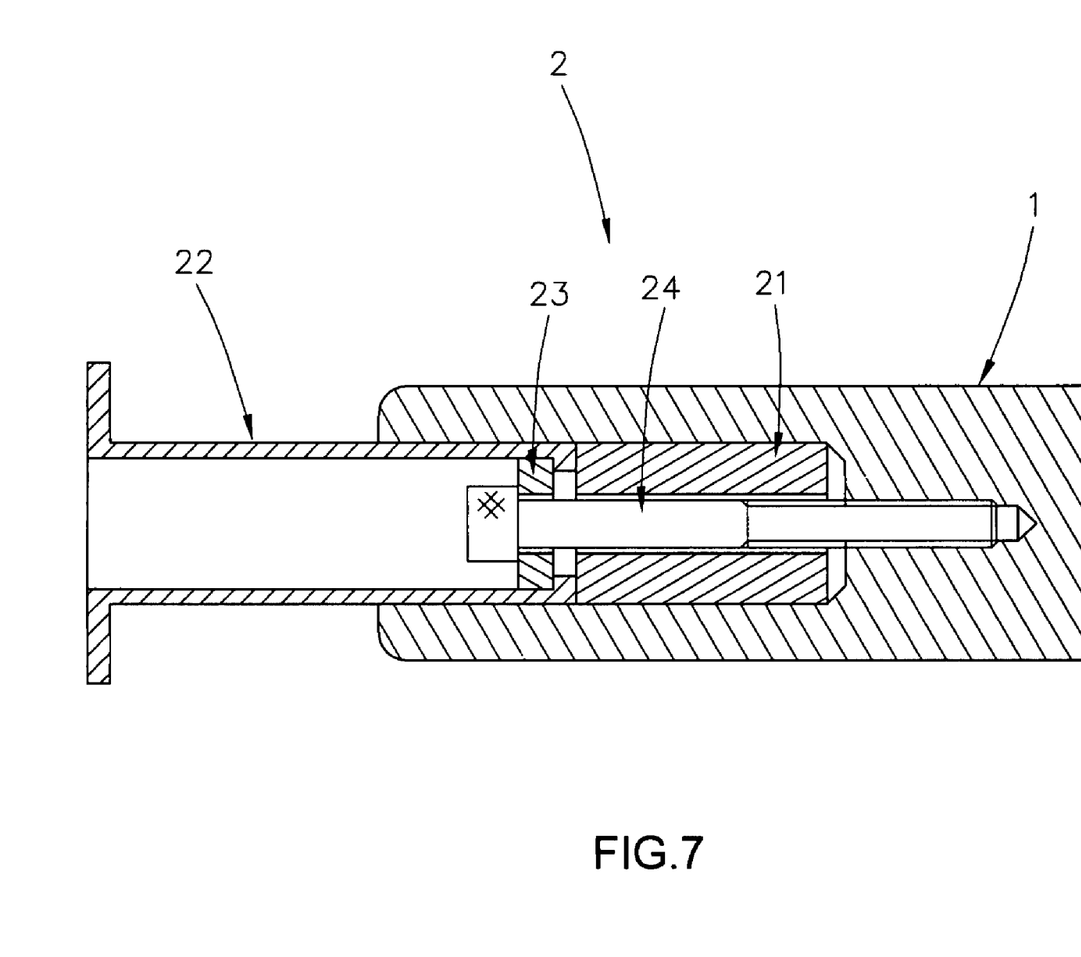
FIG. 7 is cross sectional view to show the mold guiding device of the present invention wherein the sleeve is positioned stationary.

Referring to FIGS. 6 and 7, the mold guiding device of the present invention comprises a tube 1 having a hole 11 defined in an end thereof and a threaded recess 111 is defined in an inner end of the hole 11. The hole 11 includes an equal and even inner diameter. A control unit 2 includes a positioning member 21 and a sleeve 22, wherein the positioning member 21 is inserted in the hole 11 of the tube 1 and has a central hole defined therethrough. The sleeve 22 has a first end thereof inserted in the hole 11 of the tube 1 and a flange 221 extends radially outward from a second end of the sleeve 22. A passage 222 is defined through the sleeve 22 and forms an opening in the first end of the sleeve 22. An annular lip 223 extends inward from the opening at the first end of the sleeve 22.

A rod 24 includes a head and a threaded section, the rod 24 extends through the passage 222 of the sleeve 22 and the central hole of the positioning member 21. The threaded section and is threadedly engaged with the threaded recess 111 in the tube 1. A washer 23 is mounted to the rod 24 and a hole in the washer 23 through which the rod 18 extends is smaller than the head of the rod 24 so that the washer 23 cannot disengaged from the head of the rod 24. An outer diameter of the washer 23 is larger than a diameter of the opening of the sleeve 22 and a diameter of the positioning member 21 is the same as a diameter of the sleeve 22, so that the first end of the sleeve 22 is in contact with an end of the positioning member 21, while the washer 23 is clamped between the annular lip 223 of the sleeve 22 and the head of the rod 24.

Figure 8:
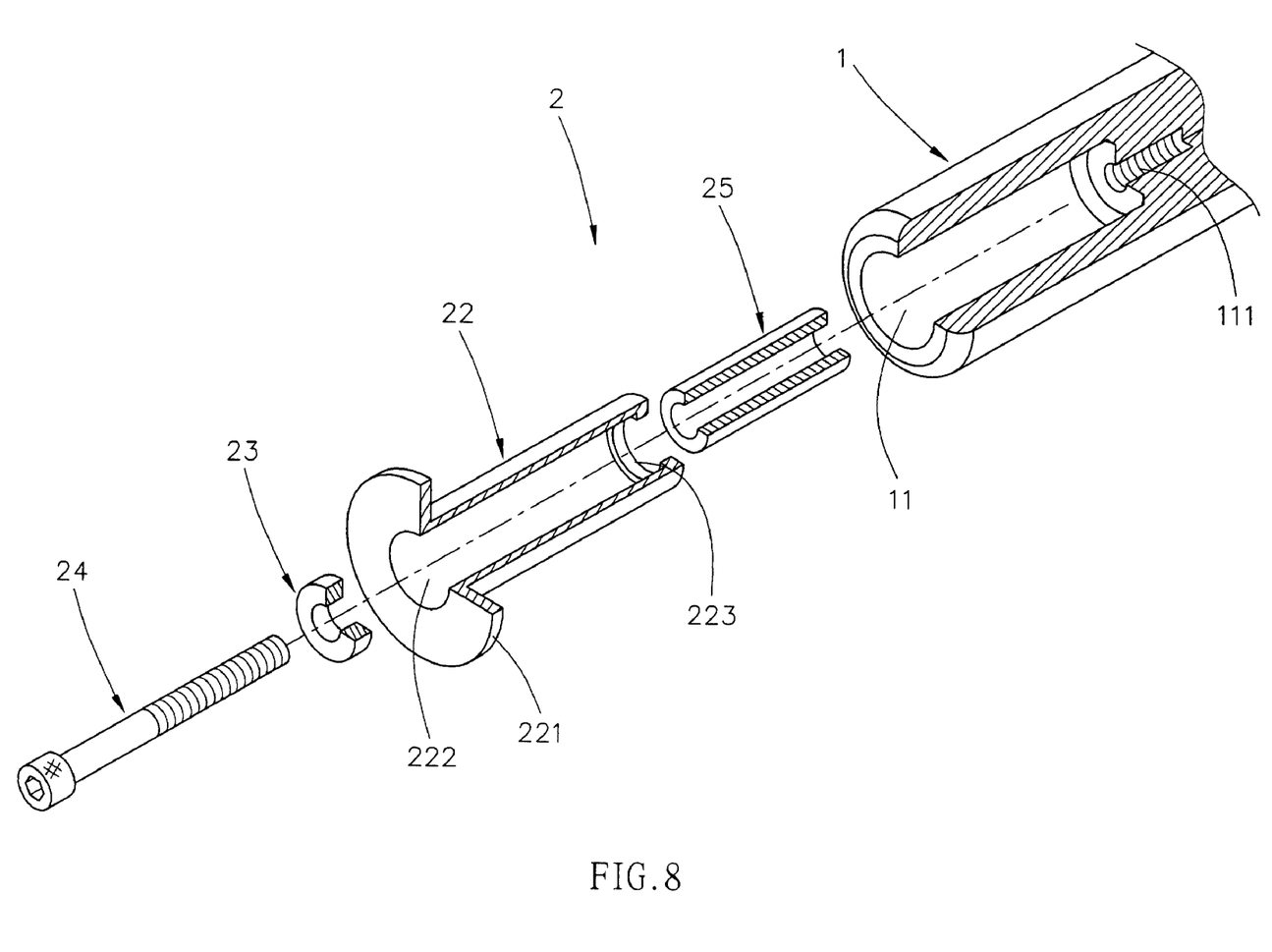
FIG. 8 is an exploded view to show the mold guiding device of the present invention wherein the sleeve is movable.
Figure 9:
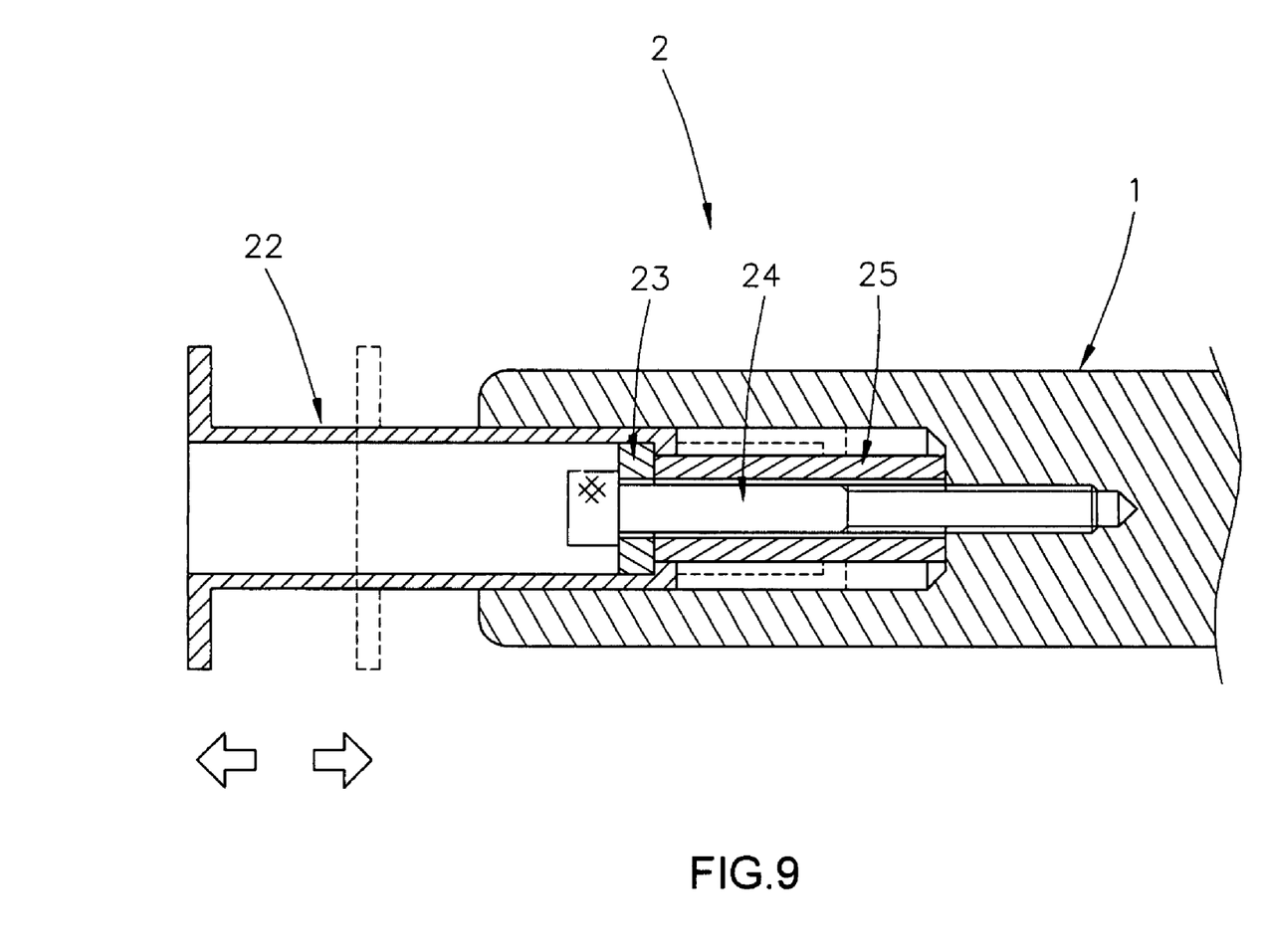
FIG. 9 is cross sectional view to show the mold guiding device of the present invention wherein the sleeve is movable.

As shown in FIGS. 8 and 9, if the sleeve 22 is set to be movable, the positioning member 21 is replaced with another positioning member 25 wherein a diameter of the positioning member 25 is smaller than an inner diameter of the opening in the sleeve 22, so that the sleeve 22 is slidably mounted to the positioning member 21.

The users need to prepare two positioning members 21 and 25 for replacing them with each other and the rest of the parts of the mold guiding device can be used in both operation statuses. Besides, the hole 11 has an equal and even inner diameter such that the expense for manufacturing the hole 11 is lower than the conventional mold guiding devices.

While we have shown and described the embodiment in accordance with the present invention, it should be clear to those skilled in the art that further embodiments may be made without departing from the scope of the present invention.

What is claimed is:

1. A mold guiding device comprising:
   a tube having a hole defined in an end thereof and a threaded recess defined in an inner end of the hole;
   a positioning member inserted in the hole of the tube and having a central hole defined therethrough;
   a sleeve having a first end thereof inserted in the hole of the tube and a flange extending radially outward from a second end of the sleeve, a passage defined through the sleeve and forming an opening in the first end of the sleeve, an annular lip extending inward from the opening at the first end of the sleeve, the positioning member movably inserted in the sleeve, and
   a rod extending through the passage of the sleeve and the central hole of the positioning member and threadedly engaged with the threaded recess in the tube, the rod including a head and a washer mounted to the rod, an outer diameter of the washer being larger than a diameter of the opening of the sleeve and a hole in the washer through which the rod extends being smaller than the head of the rod.

* * * * *